Patented Jan. 4, 1927.

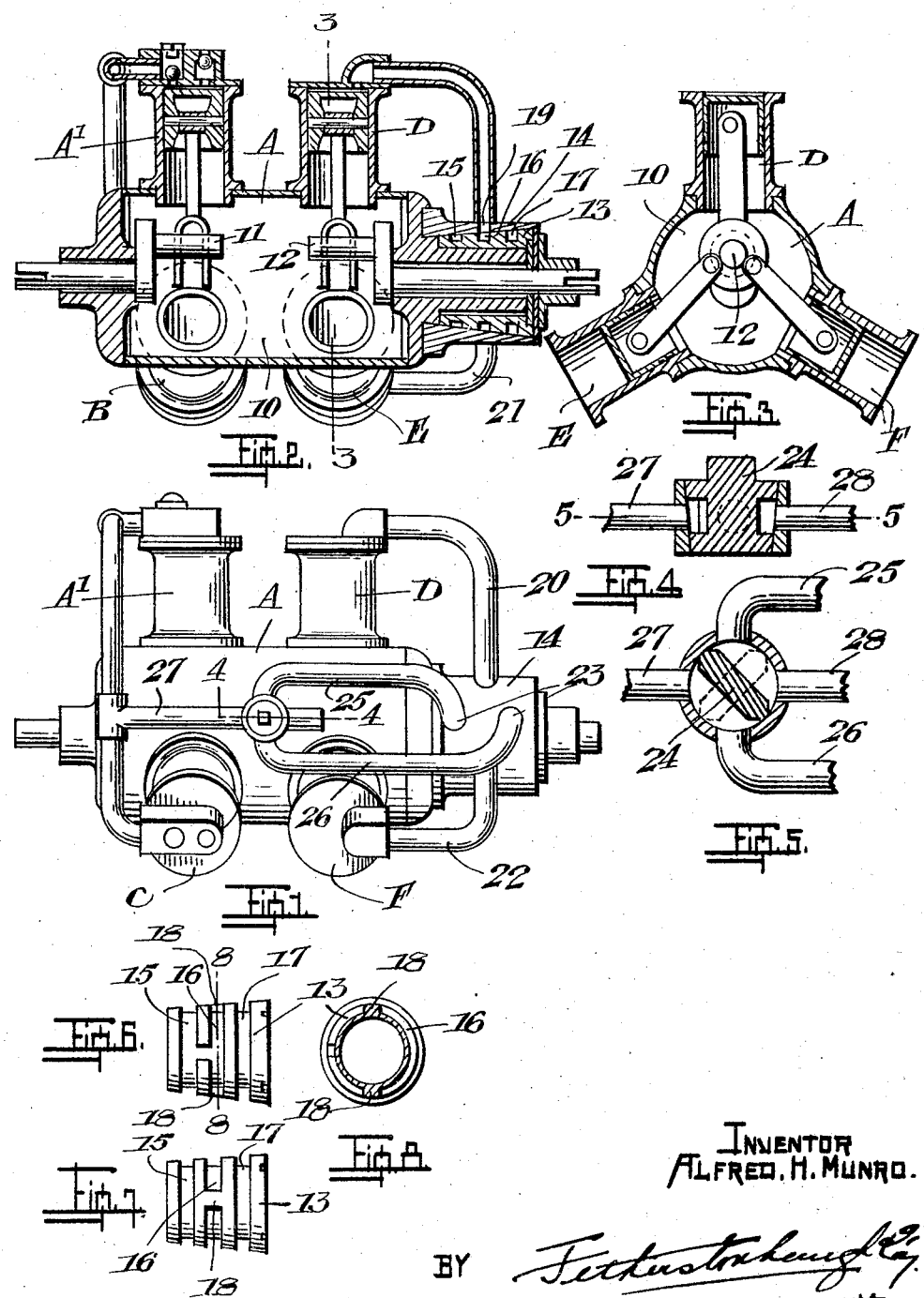

1,613,525

UNITED STATES PATENT OFFICE.

ALFRED HORNER MUNRO, OF REGINA, SASKATCHEWAN, CANADA.

POWER-TRANSMISSION GEAR.

Application filed November 2, 1923, Serial No. 672,334, and in Canada March 3, 1922.

My invention relates to the transmission of power through the medium of compressed air, and the objects of my invention are, first, to obviate the necessity for a clutch to connect a prime mover to a driven member, second, silence, third, provision of practically unlimited gear ratios between minimum and maximum, fourth flexibility, fifth complete isolation of prime mover from transmission shocks.

I attain these objects by the mechanism illustrated in the accompanying drawing, in which:

Figure 1 is a side view of an embodiment of my improved machine.

Figure 2 is a vertical section.

Figure 3 is a section on the line 3—3 of Figure 2.

Figure 4 is a section on the line 4—4 of Figure 1.

Figure 5 is a section on the line 5—5 of Figure 4.

Figure 6 is a side elevation of the rotary distributing valve.

Figure 7 is a top plan view of Figure 6.

Figure 8 is a section on the line 8—8 of Figure 6.

In the drawings, in which similar numerals of reference indicate corresponding parts in each of the several views, A designates the device as a whole comprising a plurality of cylinders A', B, C, D, E and F. These cylinders are arranged radially in two sets of three on a common crank case 10, see Figure 3.

Referring now to Figure 2, 11 and 12 are two individual crank shafts, the crank shaft 11 being connected through connecting rods to pistons in the cylinders A', B and C and crank shaft 12 being similarly connected to pistons in the cylinders D, E and F. The crank shaft 12, besides delivering the power generated by cylinders D, E and F, is also used to rotate a rotary distributor valve 13 (Figures 2, 6, 7 and 8) provided with a suitable housing 14. This valve is formed as a hollow cone of suitable material, preferably of metal, provided with three annular grooves 15, 16 and 17 on its periphery, the end grooves 15 and 17 being continuous while the centre groove 16 is interrupted at diametrical points 18, as shown in Figure 7. The groove 15 communicates with one half of the groove 16 and the groove 17 communicates with the other half of the groove 16, as shown in Figures 6 and 8.

The valve housing 14 is mounted on the end of the crank case 10 and surrounding the crank shaft 12, as shown in Figure 2, the housing having a tapered bore to fit the taper of the valve 13, while equi-distant around the circumference are a plurality of ports 19 adapted to communicate with the groove 16. Each of these ports is connected to cylinders D, E and F, respectively, by pipes 20, 21 and 22.

The housing 14 is also provided with holes 23, one of which communicates with the groove 15 and the other with the groove 17 and connected to control valve 24, see Figure 5, by pipes 25 and 26, control valve 24 being in turn connected to the cylinders A', B and C by the branch pipe 27, see Figure 4.

The heads of the cylinders A', B and C are fitted with automatic inlet and discharge valves of either the ball or mushroom type.

The operation of the machine is as follows: When the crank shaft 11 is connected to the prime mover and set in motion, the pistons in the cylinders A', B and C draw in air and compress it, delivering it to the control valve 24 through the pipe 27. If the plug of the control valve is turned to assume a diagonal position, shown by full lines in Figure 5, then the compressed air is passed to the groove 17 of the distributor valve 13 by means of the pipe 26. The air will pass from the groove 17 to one half of 16 and from 16, through ports and pipes 20, 21 and 22, to cylinders D, E and F in rotation. The other half of the groove 16 will act as the exhaust port, allowing the spent air to be discharged from cylinders to groove 15 into pipe 25 to the control valve and out through exit 28. This cycle continues as long as control valve is in the position just mentioned and thus the compressed air from cylinders A', B and C imparts its energy to D, E and F, causing them to rotate the crank shaft 12 continuously in one direction, this crank shaft, in turn, being connected as required to the mechanism to be driven.

If the plug of the control valve 13 be placed in the position shown in the dotted lines in Figure 5, then, instead of the air passing through pipe 26, it will go through pipe 25 to groove 15, thus reversing the functions of the two halves of the groove 16 and thereby causing the crank shaft 12 to rotate in the opposite direction.

Should the plug of control valve be set half way between the two settings in a substantially horizontal position, then the compressed air will pass both sides of plug and so out to the atmosphere through the exhaust pipe 28 and no power would be delivered to the cylinders D, E and F, thereby attaining a free engine condition without any clutch mechanism being needed.

Again, if the control plug is turned to one of its extreme settings, the compressed air will be deflected to one side of the cylinder valve to the cylinders D, E and F and crank shaft 12 will be revolved and take up its load in whatever direction of rotation the operator may wish.

The different gear ratios between the crank shafts 11 and 12 is provided by the cylinders D, E and F lagging behind the cylinders A', B and C according to the load on the crank shaft 12, such, for instance, as the varying road conditions met by self-propelled vehicles.

What I claim as my invention is:

1. In a power transmission gear, a stationary crank case, compressor cylinders and power cylinders mounted radially in the crank case, pistons and rods for the cylinders, a crank shaft connected to the piston rods of the compressor cylinders, a second crank shaft connected to the piston rods of the power cylinders, a distributor valve formed with annular grooves therein on the second mentioned crank shaft, a housing having orifices therein communicating with said grooves, a control valve and pipes connecting the control valve with said orifices and a branch pipe connecting the control valve with the compressor cylinders.

2. In a power transmission gear, a crank casing, a plurality of radiating compressing cylinders and a plurality of radiating working cylinders arranged in two sets, a crank case common to said cylinders, pistons and rods for the cylinders, a driving crank shaft operatively connected to the compressor cylinder piston rods and a driven crank shaft operatively connected to the working cylinder piston rods, a rotary distributor valve of hollow cone shape and provided with an interrupted annular groove and continuous annular grooves communicating with the interrupted annular groove, a housing for the valve, a plurality of orifices in the housing adapted to communicate with the interrupted valve groove and pipe means connecting the orifices with the working cylinders, a pair of orifices in the housing communicating with the continuous valve grooves, a control valve and pipe means connecting the control valve with said orifices and a branch pipe connecting the control valve with the compressor cylinders.

3. The device as claimed in claim 2 in which the interrupted groove is diametrically interrupted and is located between the continuous grooves, each of the latter grooves communicating with a half of the interrupted groove.

4. In a device of the character described and in combination with a plurality of compressor cylinders and working cylinders and crank shafts for said cylinders, a distributor valve on the working cylinder crank shaft, substantially cone shaped and provided with three grooves, the centre groove being diametrically interrupted, one half thereof communicating with one outside groove and the other half with the other outside groove, a valve casing having a series of orifices arranged at equal distances around the circumference and designed to register with said centre groove and pipe means connecting the orifices with said working cylinders, a pair of orifices adapted to individually communicate with each of the remaining grooves, a control valve and pipe means connecting the second mentioned orifices with said valve and pipe means connecting the control valve with the compressor cylinders.

In witness whereof I have hereunto set my hand.

ALFRED HORNER MUNRO.